Dec. 1, 1931. R. S. NEWTON 1,834,253
BACK-UP VALVE
Filed Oct. 9, 1930 2 Sheets-Sheet 1

Inventor
Robert S. Newton
By Dodge and Son
Attorneys

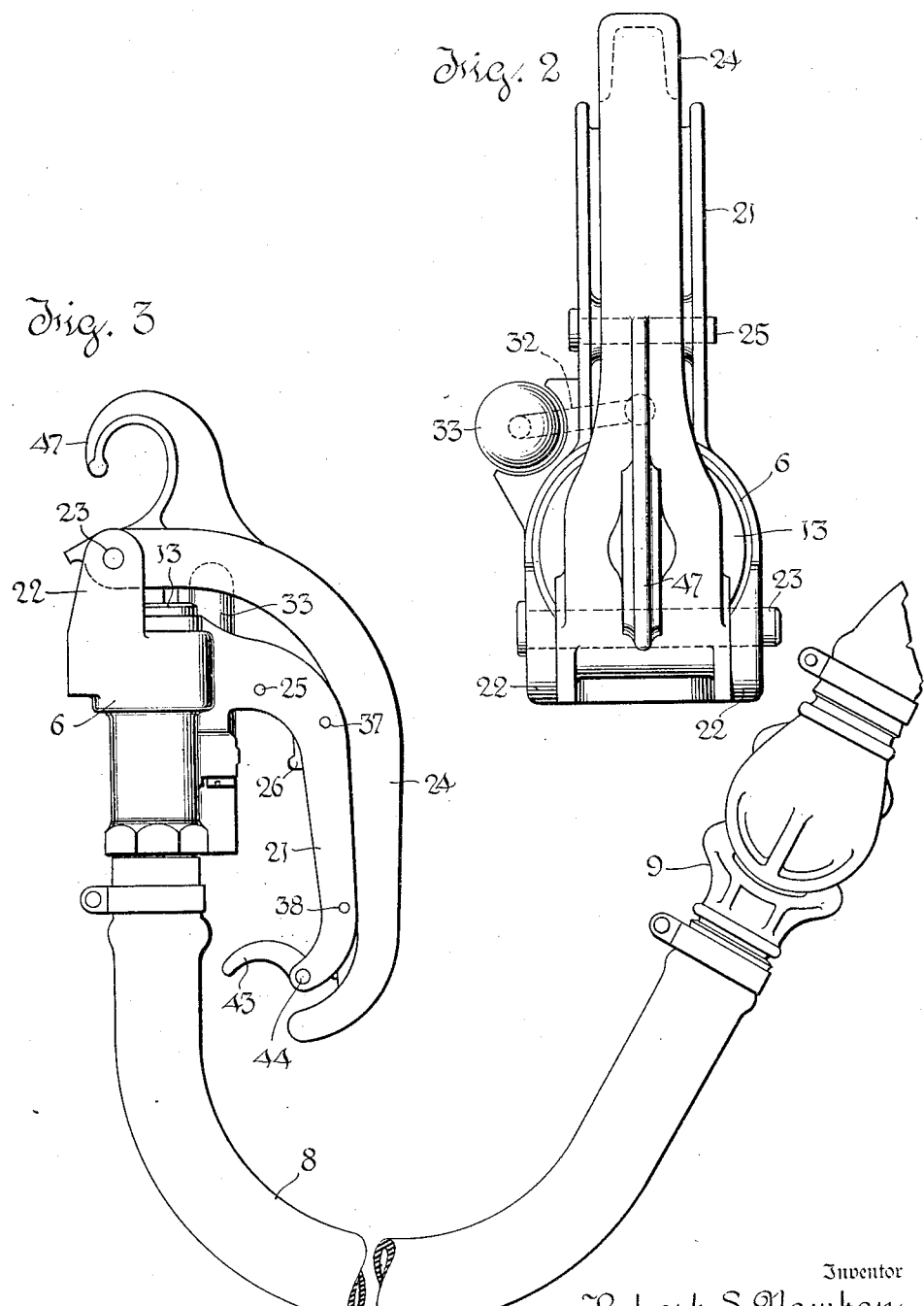

Patented Dec. 1, 1931                                            1,834,253

UNITED STATES PATENT OFFICE

ROBERT S. NEWTON, OF WATERTOWN, NEW YORK, ASSIGNOR TO THE NEW YORK AIR BRAKE COMPANY, A CORPORATION OF NEW JERSEY

BACK-UP VALVE

Application filed October 9, 1930. Serial No. 487,611.

This invention relates to air brakes and particularly to devices known as back-up valves.

In backing trains in yards and into stations, the brakeman at the rear of the train must control the brakes, and does so by means of a back-up valve connected to the brake pipe at the end of the train. By means of this he vents the brake pipe slowly or rapidly to produce service or emergency applications, as circumstances may require. Such devices customarily include a warning signal whistle operated by air from the brake pipe and controlled by a valve which the brakeman actuates manually.

Recently back-up valves of the so-called "dead-man" type, have come into use, a dead-man valve being one which tends to open and freely vent the brake pipe, and must be held closed by the operative. While attaching such valves to the end of a train, and while climbing to position, the brakeman needs free use of his hands. As it is essential to proper train handling to prevent the occurrence, at such time, of an undesired emergency application, it is necessary to apply to the dead-man valve some means for temporarily suspending its dead-man function.

The purpose of the present invention is to prevent the suspension of the dead-man function by such means, while the train is in motion. The result is accomplished by providing an interlock between the signal valve and the means for suspending the dead-man function, which interlock prevents blowing of the signal whistle when the dead-man function is suspended. As the signal whistle must be blown frequently, and as failure to blow it would be "spotted" by inspectors, temptation is removed, or at least effectively counteracted.

The preferred embodiment of the invention is illustrated in the accompanying drawings, in which,—

Fig. 2 is a plan view.

Fig. 3 is an elevation showing the valve with the usual short length of hose and hose coupling for attachment to a brake pipe.

Figure 1:
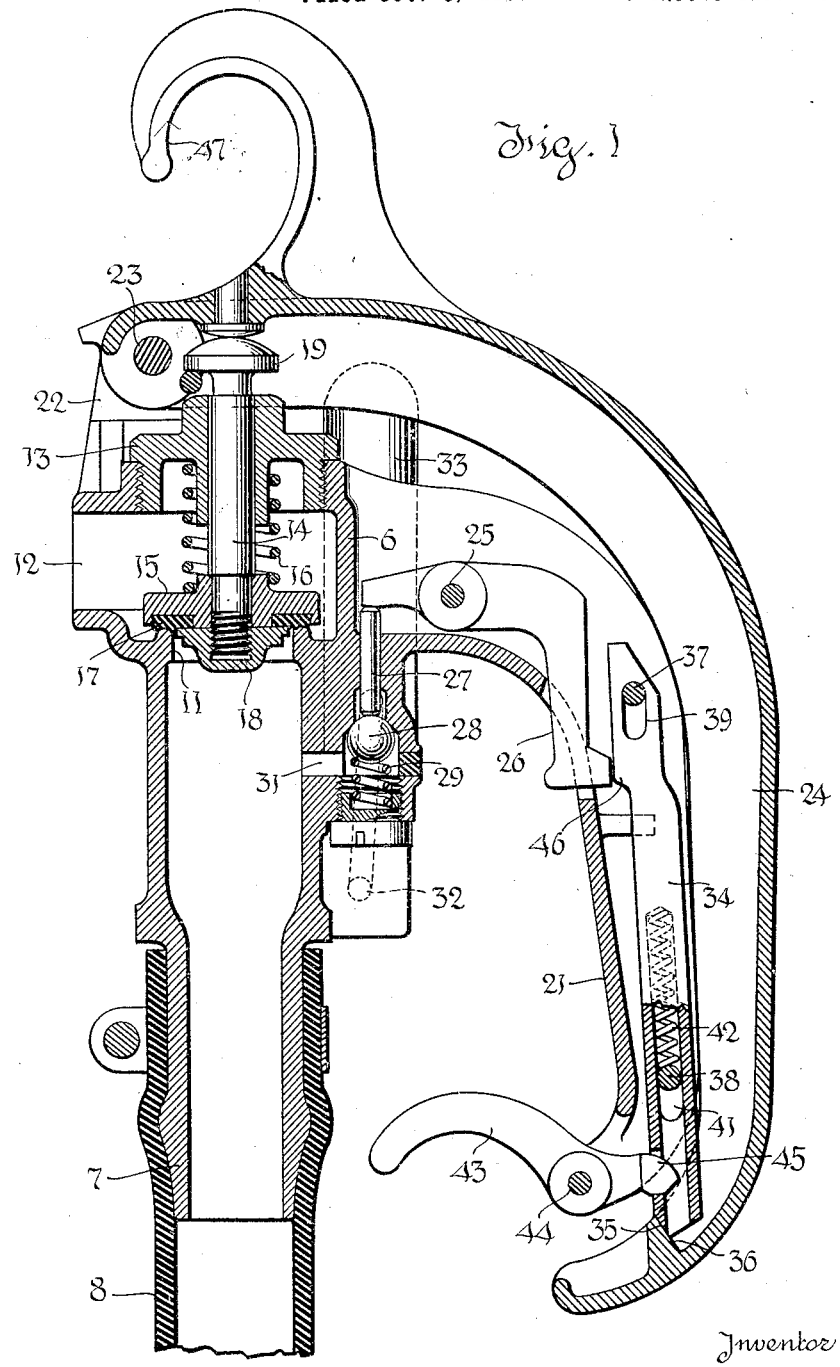
Fig. 1 is a vertical axial section.

The valve body is illustrated at 6 and is formed with a nipple 7 for attachment of the hose 8 which carries at its other end the coupling 9.

Formed in the valve body is a seat 11 controlling a lateral vent passage 12. Opposite the seat 11 is a threaded aperture which receives the threaded plug 13. Plug 13 is formed with a guideway for the stem 14 of valve 15, which coacts with seat 11. A light spring 16 urges the valve in a closing direction, but with only sufficient force to seat the valve when the device is not under pressure, for convenience in manipulation. When the device is under pressure the valve opens automatically.

The valve 15 has a rubber face 17 held by a cap nut 18, and the stem 14 is formed at its outer end with a head or button 19. Formed integrally with body 6 and at one side thereof is a hand-grip member 21, U-shaped in cross section. At its outer end, adjacent valve stem 14, the body 6 carries two lugs 22 between which is pivoted on pin 23 a curved lever 24, which parallels the grip 21, and, like the grip member 21, is U-shaped in cross section.

As shown in Fig. 2, the lever 24 is narrower than the grip member 21, so that the flanges of the lever enter between the flanges of the grip member, forming a hand grip of rounded cross section. By grasping the grip, made up of member 21 and lever 24, the operator holds valve 15 closed.

Mounted between the flanges of member 21 on pivot 25 is a trigger 26, which projects through a slot in member 21, in position to be actuated by the index finger of the hand which grasps the grip. The trigger forms a sort of bell-crank, one end of which engages the thrust pin 27 to force ball check valve 28 in an opening direction against the action of spring 29. When the valve is unseated, air may flow from the brake pipe by way of ports 31 and 32 to a whistle 33. Such air flow is not rapid enough to apply the brakes.

Slidably mounted in the member 21 between the flanges thereof is a latch bar 34 having a beveled nose 35 adapted to coact with a beveled keeper 36 on the lever 24. The latch bar 34 is supported and guided by pins 37 and 38, which pass through slots 39 and 41 in the bar. The bar is urged in a disengaging direction by the coil spring 42 and may be forced in an engaging direction by the hook-like suspending lever 43 which is pivoted at 44 on member 21, and has a head 45 working in a recess in bar 34.

The bar 34 is formed with a shoulder 46 which passes into and out of obstructing relation with the trigger 26 as the nose 35 moves into and out of engaging relation with the keeper 36.

For suspending the device under normal conditions of use, a hook 47 is formed on lever 24.

The device is used as follows:—The coupling 9 is attached to the coupling on the hose at the rear end of the rear car, and the device is suspended by hooking the lever 43 on a grab-iron, platform railing or the like. When hooking the device on the support, the operator engages the nose 35 with keeper 36, the weight of the device maintaining the engagement and acting to seat valve 15 tightly.

The above operations may be performed in any order, and thereafter the angle cock at the rear of the rear car is opened. The operator then climbs to position, grasps the grip formed by the members 21 and 24, and lifts the device to release lever 43. Latch bar 34 is immediately disengaged by spring 42, releasing lever 24 to restore the dead-man function, and releasing trigger 26 to permit manual actuation of the whistle valve.

The operator must grasp the grip tightly to prevent a brake application. He may relieve himself of the weight of the device by hanging the device on hook 47, but he cannot engage the latch bar 34 without locking the whistle valve. As the whistle must be in frequent use, the effect is to eliminate improper use of the latch.

Various modifications are possible and are contemplated.

What is claimed is,—

1. In a back-up valve for air brakes, the combination of a body adapted for connection with a brake pipe; means controlling the venting of said body and having an opening tendency, said means and a part associated with the body being adapted to be grasped in the hand of an operator to hold said vent controlling means closed; a signal valve operable independently of said venting means; and means for simultaneously latching said vent controlling means in vent closing position and preventing actuation of said signal valve.

2. In a back-up valve for air brakes, the combination of a body adapted for connection with a brake pipe; means controlling the venting of said body and having an opening tendency, said means and a part associated with the body being adapted to be grasped in the hand of an operator to hold said vent controlling means closed; a signal valve operable independently of said venting means; means for simultaneously latching said vent controlling means in vent closing position and preventing actuation of said signal valve; and yielding means urging said latching means in disengaging direction.

3. In a back-up valve for air brakes, the combination of a body adapted for connection with a brake pipe; means controlling the venting of said body and having an opening tendency, said means and a part associated with the body being adapted to be grasped in the hand of an operator to hold said vent controlling means closed; a signal valve operable independently of said venting means; means for simultaneously latching said vent controlling means in vent closing position and preventing actuation of said signal valve; yielding means urging said latching means in disengaging direction; and means for supporting said body, operatively connected with said latching means, and serving to shift said latching means in an engaging direction when the body is supported thereby.

4. In a back-up valve device, the combination of a body having a brake pipe connection and a brake pipe discharge passage; a discharge valve controlling said passage, and having an opening tendency when the device is in use; an air operated warning signal; a signal valve controlling flow to said signal; a grip structure including a part associated with said body, and a part associated with said discharge valve, and adapted to be grasped in an operator's hand to hold the discharge valve closed; means operable by a digit of the same hand while grasping said grip structure, to actuate said signal valve; and a latch mechanism for simultaneously holding said discharge valve closed and preventing actuation of said signal valve.

5. In a back-up valve device, the combination of a body having a brake pipe connection and a brake pipe discharge passage; a discharge valve controlling said passage, and having an opening tendency when the device is in use; an air operable warning signal; a signal valve controlling flow to said signal; a grip structure including a part associated with said body, and a part associated with said discharge valve, and adapted to be grasped in an operator's hand to hold the discharge valve closed; means operable by a digit of the same hand while grasping said grip structure, to actuate said signal valve; and a wedging latch mechanism for simultaneously urging the parts of said grip structure together and preventing actuation of said signal valve actuating means.

6. In a back-up valve device, the combination of a body having a brake pipe connection and a brake pipe discharge passage; a discharge valve controlling said passage, and having an opening tendency when the device is in use; an air operated warning signal; a signal valve controlling flow to said signal; a grip structure including a part associated with said body, and a part associated with said discharge valve, and adapted to be grasped in an operator's hand to hold the discharge valve closed; means operable by a digit of the same hand while grasping said grip structure, to actuate said signal valve; a latch mechanism for simultaneously holding said discharge valve closed and preventing actuation of said signal valve; and yielding means urging said latch mechanism in a releasing direction.

7. In a back-up valve device, the combination of a body having a brake pipe connection and a brake pipe discharge passage; a discharge valve controlling said passage, and having an opening tendency when the device is in use; an air operated warning signal; a signal valve controlling flow to said signal; a grip structure including a part associated with said body, and a part associated with said discharge valve, and adapted to be grasped in an operator's hand to hold the discharge valve closed; means operable by a digit of the same hand while grasping said grip structure, to actuate said signal valve; a wedging latch mechanism for simultaneously urging the parts of said grip structure together and preventing actuation of said signal valve actuating means; and yielding means urging said latch mechanism in a releasing direction.

8. In a back-up valve device, the combination of a body having a brake pipe connection and a brake pipe discharge passage; a discharge valve controlling said passage, and having an opening tendency when the device is in use; an air operated warning signal; a signal valve controlling flow to said signal; a grip structure including a part associated with said body, and a part associated with said discharge valve, and adapted to be grasped in an operator's hand to hold the discharge valve closed; means operable by a digit of the same hand while grasping said grip structure, to actuate said signal valve; a latch mechanism for simultaneously holding said discharge valve closed and preventing actuation of said signal valve; yielding means urging said latch mechanism in a releasing direction; and means for supporting said body, operatively connected with said latch mechanism and serving to shift the same in an engaging direction when the body is supported by said supporting means.

9. In a back-up valve device, the combination of a body having a brake pipe connection and a brake pipe discharge passage; a discharge valve controlling said passage, and having an opening tendency when the device is in use; an air operated warning signal; a signal valve controlling flow to said signal; a grip structure including a part associated with said body, and a part associated with said discharge valve, and adapted to be grasped in an operator's hand to hold the discharge valve closed; means operable by a digit of the same hand while grasping said grip structure, to actuate said signal valve; a wedging latch mechanism for simultaneously urging the parts of said grip structure together and preventing actuation of said signal valve actuating means; yielding means urging said latch mechanism in a releasing direction; and means for supporting said body, operatively connected with said latch mechanism and serving to shift the same in an engaging direction when the body is supported by said supporting means.

10. The combination of a self-opening dead-man brake pipe vent valve; a signal device; normally inactive means for locking said vent valve closed; and means rendered effective by the operation of said locking means to prevent the actuation of said signal device.

11. The combination of a self-opening dead-man brake pipe vent valve; normally inactive means for suspending the self-opening function of said vent valve; a secondary manually operable mechanism associated with said vent valve; and means effective when said normally inactive means is active, to control actuation of said secondary mechanism.

In testimony whereof I have signed my name to this specification.

ROBERT S. NEWTON.